US012574773B2

(12) United States Patent
Hu et al.

(10) Patent No.: US 12,574,773 B2
(45) Date of Patent: Mar. 10, 2026

(54) MEASUREMENT GAP DETERMINING METHOD AND APPARATUS, AND TERMINAL

(71) Applicant: GUANGDONG OPPO MOBILE TELECOMMUNICATIONS CORP., LTD., Guangdong (CN)

(72) Inventors: Rongyi Hu, Guangdong (CN); Weijie Xu, Guangdong (CN); Shukun Wang, Guangdong (CN); Cong Shi, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 494 days.

(21) Appl. No.: 17/549,888

(22) Filed: Dec. 14, 2021

(65) Prior Publication Data

US 2022/0104059 A1     Mar. 31, 2022

Related U.S. Application Data

(63) Continuation of application No. PCT/CN2019/091376, filed on Jun. 14, 2019.

(51) Int. Cl.
*H04W 24/10* (2009.01)
*H04W 24/02* (2009.01)

(52) U.S. Cl.
CPC ........... *H04W 24/10* (2013.01); *H04W 24/02* (2013.01)

(58) Field of Classification Search
CPC .............................. H04W 24/10; H04W 24/02
See application file for complete search history.

(56) References Cited

U.S. PATENT DOCUMENTS

| 2019/0182000 A1* | 6/2019 | Futaki ................... H04L 5/0053 |
| 2020/0288337 A1* | 9/2020 | Callender ............. H04W 24/10 |
| 2020/0367196 A1* | 11/2020 | Chen ..................... H04L 5/0053 |

FOREIGN PATENT DOCUMENTS

| CN | 108200593 | 6/2018 |
| CN | 109391935 | 2/2019 |
| CN | 109788492 | 5/2019 |

(Continued)

OTHER PUBLICATIONS

3GPP, "Technical Specification Group Radio Access Network; NR; Requirements for support of radio resource management (Release 15)", 3GPP TS 38.133 V15.5.0, Mar. 2019, pp. 20-170. Chapter 8.2 & Chapter 8.6.

(Continued)

*Primary Examiner* — Rhonda L Murphy
(74) *Attorney, Agent, or Firm* — Hodgson Russ LLP

(57) ABSTRACT

Embodiments of the disclosure provide a measurement gap determining method and apparatus, and a terminal. The method comprises: the terminal receives first configuration information and/or second configuration information sent by a network device, wherein the first configuration information is used for the terminal to determine a first measurement gap used before BWP switch and a second measurement gap used after the BWP switch, and the second configuration information is used for the terminal to determine a first measurement gap sharing scheme used before the BWP switch and a second measurement gap sharing scheme used after the BWP switch.

18 Claims, 9 Drawing Sheets

The terminal receives the first configuration information and/or the second configuration information sent by the network device; the first configuration information is used for the terminal to determine the first measurement gap before the BWP switch and the second measurement gap used after the BWP switch and the second configuration information is used for the terminal to determine the first measurement gap sharing scheme used before the BWP switch and the second measurement gap sharing scheme used after the BWP switch

301

(56)         References Cited

FOREIGN PATENT DOCUMENTS

| CN | 109802779 | 5/2019 |
| JP | 2013162374 | 8/2013 |

OTHER PUBLICATIONS

3GPP, "Technical Specification Group Radio Access Network; NR; Radio Resource Control (RRC) protocol specification (Release 15)", 3GPP TS 38.331 V15.5.0, Mar. 2019, pp. 1-491. Chapter 6.3.2.

"International Search Report (Form PCT/ISA/210) of PCT/CN2019/091376," mailed on Mar. 6, 2020, with English translation thereof, pp. 1-6.

"Written Opinion of the International Searching Authority (Form PCT/ISA/237) of PCT/CN2019/091376," mailed on Mar. 6, 2020, with English translation thereof, pp. 1-7.

* cited by examiner

100

Figure 3:
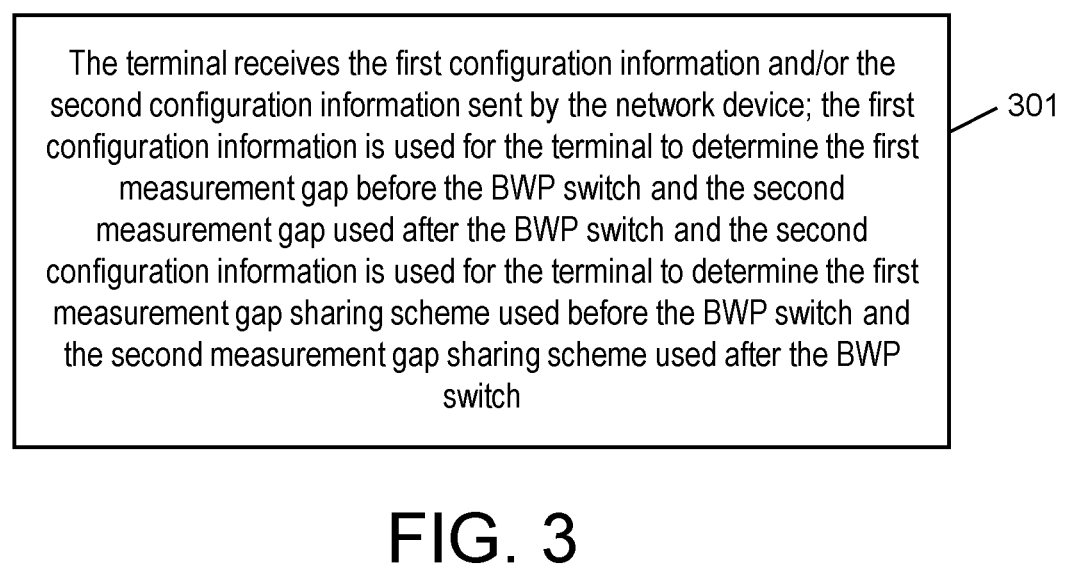

The terminal receives the first configuration information and/or the second configuration information sent by the network device; the first configuration information is used for the terminal to determine the first measurement gap before the BWP switch and the second measurement gap used after the BWP switch and the second configuration information is used for the terminal to determine the first measurement gap sharing scheme used before the BWP switch and the second measurement gap sharing scheme used after the BWP switch

MEASUREMENT GAP DETERMINING METHOD AND APPARATUS, AND TERMINAL

CROSS-REFERENCE TO RELATED APPLICATION

This application is a continuation of international PCT application serial no. PCT/CN2019/091376, filed on Jun. 14, 2019. The entirety of the above-mentioned patent application is hereby incorporated by reference herein and made a part of this specification.

BACKGROUND

Field of the Disclosure

The embodiments of the disclosure relate to the field of mobile communication technology, and in particular to a measurement gap determining method and an apparatus, and a terminal.

Description of Related Art

The purpose of measurement gap (MG) is to create a small gap in which the terminal measures a target cell. Currently, MG can only be configured through Radio Resource Control (RRC) signaling, and Band Width Part (BWP) switch can be indicated through Downlink Control Information (DCI). Relatively speaking, BWP switch is more flexible than MG configuration. In Rel-15, it is difficult for the network to configure or deconfigure MG based on BWP switch, so the network may always configure MG for certain measurements. In that case, for those measurements that do not require MG, system throughput loss will be generated.

SUMMARY OF THE DISCLOSURE

The embodiments of the disclosure provide a measurement gap determining method and an apparatus, and a terminal.

The measurement gap determining method provided in this embodiment of the disclosure includes:

The terminal receives first configuration information and/or second configuration information sent by a network device, the first configuration information is used for the terminal to determine a first measurement gap used before bandwidth part BWP switch and a second measurement gap used after the BWP switch, and the second configuration information is used for the terminal to determine a first measurement gap sharing scheme used before the BWP switch and a second measurement gap sharing scheme used after the BWP switch.

In the measurement gap determining apparatus provided in the embodiment of the disclosure, the apparatus includes:

The receiving circuit is configured to receive first configuration information and/or second configuration information sent by a network device, the first configuration information is used for the terminal to determine a first measurement gap used before BWP switch and a second measurement gap used after the BWP switch, and the second configuration information is used for the terminal to determine a first measurement gap sharing scheme used before the BWP switch and a second measurement gap sharing scheme used after the BWP switch.

The terminal provided in the embodiment of the disclosure includes a processor and a memory. The memory is configured to store a computer program, and the processor is configured to invoke and run the computer program stored in the memory to execute the measurement gap determining method.

The chip provided in the embodiment of the disclosure is used to implement the measurement gap determining method.

Specifically, the chip includes: a processor, which is configured to invoke and run a computer program in the memory, so that the device provided with the chip executes the measurement gap determining method.

The computer-readable storage medium provided by the embodiment of the disclosure is configured to store a computer program that enables the computer to execute the measurement gap determining method described above.

The computer program product provided by the embodiment of the disclosure includes a computer program instruction that enables the computer to execute the measurement gap determining method.

When the computer program provided in the embodiment of the disclosure is run on a computer, the computer executes the measurement gap determining method described above.

The technical solution of the embodiments of the disclosure provides a more effective solution to coordinate the configuration of the measurement gap to dynamically adapt to the influence of the measurement that does not require the measurement gap caused by the BWP switch, thereby optimizing the throughput of the network and the terminal.

BRIEF DESCRIPTION OF THE DRAWINGS

The drawings described here are used to provide a further understanding of the disclosure and constitute a part of the disclosure. The exemplary embodiments and descriptions of the disclosure are used to explain the disclosure and do not constitute an improper limitation of the disclosure. In the drawings:

FIG. 3 is a schematic flowchart of a measurement gap determining method embodied in an embodiment of the disclosure.

FIG. 6 is a schematic diagram of inter-frequency measurement embodied in an embodiment of the disclosure.

DESCRIPTION OF EMBODIMENTS

The technical solutions in the embodiments of the disclosure will be described below in conjunction with the drawings in the embodiments of the disclosure. Obviously, the embodiments described below are part of the embodiments of the disclosure, not all of the embodiments. Based on the embodiments in this disclosure, all other embodiments obtained by those of ordinary skill in the art without inventive effort shall fall within the scope to be protected by the disclosure.

The technical solutions in the embodiments of the disclosure can be applied to various communication systems, such as: Global System of Mobile communication (GSM) system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD), Universal Mobile Telecommunication System (UMTS), Worldwide Interoperability for Microwave Access (WiMAX) communication system, or 5G system and so on.

Figure 1:
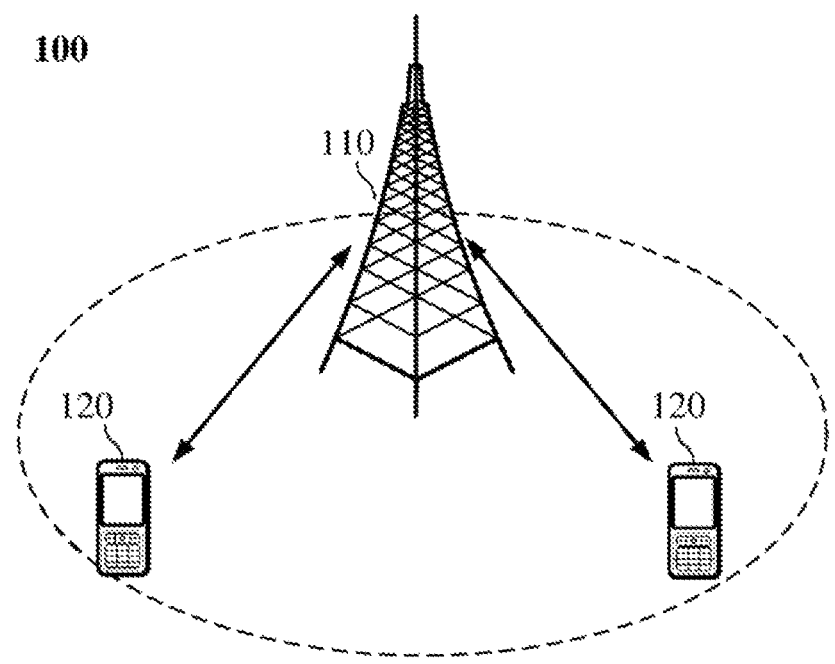
FIG. 1 is a schematic diagram of a communication system architecture embodied in an embodiment of the disclosure.

Exemplarily, the communication system 100 applied in the embodiment of the disclosure is shown in FIG. 1. The communication system 100 may include a network device 110, and the network device 110 may be a device that communicates with a terminal device 120 (or called a communication terminal or a terminal). The network device 110 can provide communication coverage for a specific geographic area, and can communicate with a terminal located in the coverage area. Optionally, the network device 110 may be a Base Transceiver Station (BTS) in a GSM system or a CDMA system, a NodeB (NB) in a WCDMA system, or an Evolutional Node B (eNB or eNodeB) in the LTE system, or the wireless controller in the Cloud Radio Access Network (CRAN). Alternatively, the network device can be a mobile switch center, a relay station, an access point, a vehicle-mounted device, a wearable device, a hub, a switch, a bridge, a router, network devices in 5G networks, or network devices in the future evolution of the Public Land Mobile Network (PLMN), etc.

The communication system 100 further includes at least one terminal 120 located within the coverage area of the network device 110. As used herein, "terminal" includes but is not limited to connection via wired lines, such as connection via Public Switched Telephone Networks (PSTN), Digital Subscriber Line (DSL), digital cable, direct cable connection; and/or another data connection/network; and/or via a wireless interface, such as for cellular networks, wireless local area networks (WLAN), digital TV networks such as DVB-H networks, satellite networks, AM-FM broadcasting transmitter; and/or an apparatus with another terminal configured to receive/send a communication signal; and/or an Internet of Things (IoT) device. A terminal set to communicate via a wireless interface may be referred to as a "wireless communication terminal", a "wireless terminal" or a "mobile terminal". Examples of mobile terminals include, but are not limited to, satellite or cellular phones. Personal Communications System (PCS) terminals that can be combined with cellular radio phones with data processing, fax, and data communication capabilities; can include radio phones, pagers, Internet/Intranet access, Web browser, memo pad, calendar, and/or PDA with Global Positioning System (GPS) receiver; and conventional laptop and/or palmtop receiver or other electronic apparatuses including radio phone transceiver. The terminal may refer to access terminal, User Equipment (UE), user unit, user station, mobile station, mobile stage, remote station, remote terminal, mobile device, user terminal, terminal, wireless communication device, user agent or user apparatus. The access terminal can be a cellular phone, a cordless phone, a Session Initiation Protocol (SIP) phone, a Wireless Local Loop (WLL) station, a Personal Digital Assistant (PDA), a handheld device with wireless communication function, computing devices or other processing devices connected to wireless modems, vehicle-mounted devices, wearable devices, terminals in the 5G network or terminals in future evolution of PLMN and so on.

Optionally, direct terminal connection (Device to Device, D2D) communication may be performed between the terminals 120.

Optionally, the 5G system or 5G network may also be referred to as a New Radio (NR) system or NR network.

FIG. 1 exemplarily shows a network device and two terminals. Optionally, the communication system 100 may include multiple network devices and the coverage of each network device may include more or less terminals. The disclosure provides no limitation thereto.

Optionally, the communication system 100 may further include other network entities such as a network controller and a mobility management entity, the disclosure provides no limitation thereto.

It should be understood that the devices with communication functions in the network/system in the embodiments of the disclosure may be referred to as communication devices. Taking the communication system 100 shown in FIG. 1 as an example, the communication device may include a network device 110 and a terminal 120 with communication functions. The network device 110 and the terminal 120 may be the specific devices described above, and no further description will be incorporated herein. The communication device may further include other devices in the communication system 100, such as a network controller, a Mobility Management Entity (MME), and other network entities. The disclosure provides no limitation thereto.

It should be understood that the terms "system" and "network" in this disclosure are often used interchangeably in this disclosure. The term "and/or" in this disclosure is only a term describing the association relationship between objects, which means that there can be three types of relationships. For example, A and/or B can mean: there is A only, A and B exist simultaneously, and there is B only. In addition, the character "/" in this disclosure generally indicates that the objects described with "/" are in an "or" relationship.

In order to facilitate the understanding of the technical solutions of the embodiments of the disclosure, the technologies involved in the embodiments of the disclosure are described below.

BWP Switch

Scenario of BWP Switch

Figure 2:
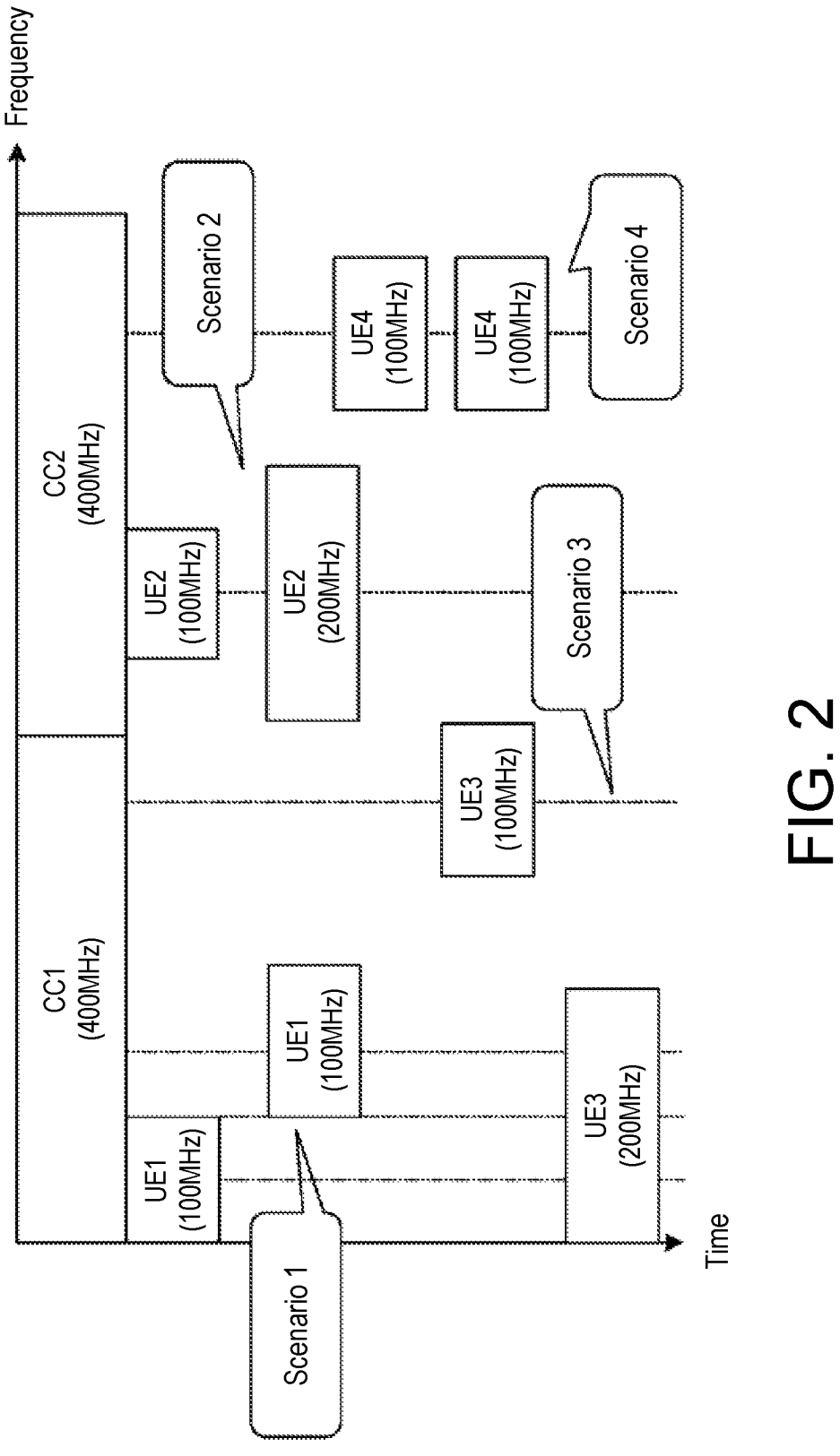
FIG. 2 is a schematic diagram showing a scenario of BWP switch embodied in an embodiment of the disclosure.

Referring to FIG. 2, BWP switch mainly has the following scenarios: Scenario 1, BWP center frequency changes before and after BWP switch; Scenario 2, BWP bandwidth changes before and after BWP switch; Scenario 3, both of the BWP center frequency and BWP bandwidth change before and after BWP switch; Scenario 4, BWP subcarrier spacing (SCS) changes before and after BWP switch.

Type of BWP Switch Triggering

Triggering BWP switch is mainly categorized into the following types: 1. DCI-based BWP switch; 2. Timer-based BWP switch; 3. RRC-based BWP switch.

Delay and Interruption of BWP Switch

1) The Delay of BWP Switch (Abbreviated as BWP Switch Delay)

For DCI-based BWP switch, timer-based BWP switch, and RRC-based BWP switch, the terminal needs to not demand to transmit uplink signals or receive downlink signals in the BWP switch delay ($T_{BWPswitchDelay}$).

Further, for RRC-based BWP switch, in addition to the BWP switch delay, the UE is not allowed to transmit uplink signals or receive downlink signals in the RRC processing delay ($T_{RRCprocessingDelay}$). The following Table 1 shows the value of BWP switch delay:

TABLE 1

| | NR Slot | | BWP switch delay $T_{BWPswitchDelay}$ (slots) | |
| μ | length (ms) | Type 1[Note 1] | | Type 2[Note 1] |
| --- | --- | --- | --- | --- |
| 0 | 1 | 1 | | 3 |
| 1 | 0.5 | 2 | | 5 |
| 2 | 0.25 | 3 | | 9 |
| 3 | 0.125 | 6 | | 18 |

Note 1
Depends on UE capability.
Note 2
If the BWP switch involves changing of SCS, the BWP switch delay is determined by the larger one between the SCS before BWP switch and the SCS after BWP switch.

2) The Interruption of the BWP Switch (Abbreviated as BWP Switch Interruption)

For BWP switch involving SCS changes, BWP switch interruption (X time slots) will also be generated. For DCI-based BWP switch and timer-based BWP switch, the BWP switch interruption is only allowed to exist in the BWP switch delay ($T_{BWPswitchDelay}$); for RRC-based BWP switch, the BWP switch interruption is only allowed to exist within BWP switch delay and RRC processing delay ($T_{BWPswitchDelay}+T_{RRCprocessingDelay}$). Table 2 shows the value of the BWP switch interruption.

TABLE 2

| μ | NR Slot length (ms) | Interruption length X (slots[note 1]) |
| --- | --- | --- |
| 0 | 1 | 1 |
| 1 | 0.5 | 1 |
| 2 | 0.25 | 3 |
| 3 | 0.125 | 5 |

Note 1
If the BWP switch involves changing of SCS, the interruption due to BWP switch is determined by the larger one between the SCS before BWP switch and the SCS after the BWP switch.

For BWP switch involving parameters (such as location, bandwidth, SRS port) other than SCS conversion, no BWP switch interruption will be generated.

Measurement Gap (MG)

UE of NR can support EN-DC, NE-DC, or NR-DC, etc., and can be configured for the measurement gap for UE (per UE per UE gap) or the measurement gap for FR (per FR gap), and further, per UE gap, only one can be configured, namely gapUE, used for measurement of FR1 and FR2 frequency. For per UE gap, the master node (MN) determines the configuration information of gap (i.e., gapUE).

per FR gap, two can be configured independently, namely gapFR1 and/or gapFR2, gapFR1 is used for measurement of FR1 frequency, and gapFR2 is used for measurement of FR2 frequency. For per FR gap, MN determines the configuration information of gapFR1, and the secondary node (SN) determines the configuration information of gapFR2.

E-UTRA only UE is configured by using LTE measurement gap, that is, per UE gap.

For example, during the gap configuration negotiation process:

For per UE gap, MN indicates per UE gap configuration information and gap purpose to SN. SN indicates the list of frequencies to be measured by MN on FR1 or/and SN on FR2.

For per FR gap, SN indicates the list of frequencies to be measured by SN on FR1, and MN indicates the list of frequencies to be measured by MN on FR2.

The following Table 3 is applicable to the measurement gap configuration in the EN-DC and NE-DC scenarios, and the following Table 4 is applicable to the measurement gap configuration in the NR-SA scenario.

TABLE 3

| Measurement gap pattern configuration | Serving cell | Purpose of measurement | Measurement gap pattern identification |
| --- | --- | --- | --- |
| Per-UE measurement gap | E-UTRA + FR1, or E-UTRA + FR2, or E-UTRA + FR1 + FR2 | non-NR RAT[Note1,2] | 0, 1, 2, 3 |
| | | FR1 and/or FR2 | 0-11 |
| | | non-NR RAT[Note1,2] and FR1 and/or FR2 | 0, 1, 2, 3, 4, 6, 7, 8,10 |
| Per FR measurement gap | E-UTRA and, FR1 if configured FR2 if configured | non-NR RAT[Note1,2] | 0, 1, 2, 3 |
| | | | No gap |
| | E-UTRA and, FR1 if configured FR2 if configured | FR1 only | 0-11 |
| | | | No gap |
| | E-UTRA and, FR1 if configured FR2 if configured | FR2 only | No gap |
| | | | 12-23 |
| | E-UTRA and, FR1 if configured FR2 if configured | non-NR RAT[Note1,2] and FR1 | 0, 1, 2, 3, 4, 6, 7, 8, 10 |
| | | | No gap |
| | E-UTRA and, FR1 if configured FR2 if configured | FR1 and FR2 | 0-11 |
| | | | 12-23 |
| | E-UTRA and, FR1 if configured FR2 if configured | non-NR RAT[Note1,2] and FR2 | 0, 1, 2, 3, 4, 6, 7, 8, 10 |
| | | | 12-23 |
| | E-UTRA and, FR1 if configured FR2 if configured | non-NR RAT[Note1,2] and FR1 and FR2 | 0, 1, 2, 3, 4, 6, 7, 8, 10 |
| | | | 12-23 |

TABLE 4

| Measurement gap pattern configuration | Serving cell | Purpose of measurement | Measurement gap pattern identification |
| --- | --- | --- | --- |
| Per-UE measurement gap | FR1, or FR1 + FR2 | E-UTRA only[NOTE3] | 0, 1, 2, 3 |
| | | FR1 and/or FR2 | 0-11 |
| | | E-UTRAN and FR1 and/or FR2[NOTE3] | 0, 1, 2, 3, 4, 6, 7, 8, 10 |

TABLE 4-continued

| Measurement gap pattern configuration | Serving cell | Purpose of measurement | Measurement gap pattern identification |
|---|---|---|---|
| | FR2 | E-UTRA only *NOTE3* | 0, 1, 2, 3 |
| | | FR1 only | 0-11 |
| | | FR1 and FR2 | 0-11 |
| | | E-UTRAN and FR1 and/or FR2 *NOTE3* | 0, 1, 2, 3, 4, 6, 7, 8, 10 |
| | | FR2 only | 12-23 |
| Per FR measurement gap | FR1 if configured | E-UTRA only *NOTE3* | 0, 1, 2, 3 |
| | FR2 if configured | | No gap |
| | FR1 if configured | FR1 only | 0-11 |
| | FR2 if configured | | No gap |
| | FR1 if configured | FR2 only | No gap |
| | FR2 if configured | | 12-23 |
| | FR1 if configured | E-UTRA and FR1 *NOTE3* | 0, 1, 2, 3, 4, 6, 7, 8, 10 |
| | FR2 if configured | | No gap |
| | FR1 if configured | FR1 and FR2 | 0-11 |
| | FR2 if configured | | 12-23 |
| | FR1 if configured | E-UTRA and FR2 *NOTE3* | 0, 1, 2, 3, 4, 6, 7, 8, 10 |
| | FR2 if configured | | 12-23 |
| | FR1 if configured | E-UTRA and FR1 and FR2 *NOTE3* | 0, 1, 2, 3, 4, 6, 7, 8, 10 |
| | FR2 if configured | | 12-23 |

The parameters of the measurement gap are configured through MeasgapConfig. The information unit of Measgap-Config is shown in Table 5 below. In MeasgapConfig, gapFR1 is used to indicate the measurement gap configuration for FR1. In the EN-DC scenario, gapFR1 cannot be configured with NR RRC, only LTE RRC can be configured with gapFR1). gapFR2 is used to indicate the measurement gap configuration for FR2. gapUE is used to indicate the measurement gap configuration for all frequencies (including FR1 and FR2). In the EN-DC scenario, gapUE cannot be configured by using NR RRC, only LTE RRC can be configured with gapUE).

TABLE 5

```
MeasgapConfig ::=          SEQUENCE {
    gapFR2                 SetupRelease { gapConfig }
OPTIONAL,    -- Need M
    ...,
    [[
      gapFR1               SetupRelease { gapConfig }
OPTIONAL,    -- Need M
      gapUE                SetupRelease { gapConfig }
OPTIONAL     -- Need M
    ]]
}
gapConfig ::=             SEQUENCE {
    gapOffset             INTEGER (0..159),
    mgl                   ENUMERATED {ms1dot5, ms3,
ms3dot5, ms4, ms5dot5, ms6},
    mgrp                  ENUMERATED {ms20, ms40,
ms80, ms160},
```

TABLE 5-continued

```
    mgta                  ENUMERATED {ms0, ms0dot25,
ms0dot5},
    ...
}
```

It should be noted that gapUE and gapFR1/gapFR2 cannot be configured simultaneously. For UE that supports EN-DC, gapUE and gapFR1 can only be configured by E-UTRA.

On the other hand, a UE capability is defined, that is, the capability regarding whether the UE supports per FR gap (that is, the capability regarding whether the UE supports independent gap measurement in different frequency ranges). This UE capability is configured through independentGapConfig, and the capability regarding whether the UE supports independent gap measurement in different frequency ranges refers to whether the UE supports the configuration of two independent measurement gaps (gapFR1, gapFR2).

Measurement Gap Sharing Scheme

The measurement gap sharing scheme allows multiple measurements to share the measurement gap. The measurement gap sharing scheme is configured by the network (such as mesGapSharingScheme). Specifically, the measurement gap sharing scheme is configured by two bits; 00 represents the opportunity for all frequency points to equally split the measurement gap; 01, 10, and 11 respectively correspond to 25, 50, 75 of the values of X, and values of X are used for determine the ratio between the intra-frequency measurement and the inter-frequency measurement occupying the measurement gap. The ratio of the intra-frequency measurement occupying the measurement gap is $K_{intra}=1/X*100$, and the ratio of the inter-frequency measurement occupying the measurement gap is $K_{inter}=1/(100-X)*100$.

In the NR RRM protocol of Rel-15, the intra-frequency measurement based on synchronization signal block (SSB) is defined as the center frequency point of the SBB serving the cell and the SSB of the target cell is the same as the SCS. If the activated BWP does not include the SSB of the target cell, the SSB of the target cell needs to be measured with a measurement gap.

If the BWP switch occurs in the intra-frequency measurement, the measurement period will be divided into two parts due to the BWP switch interruption. The intra-frequency measurement before BWP switch does not require MG, and the intra-frequency measurement after BWP switch requires MG. Likewise, if support for inter-frequency measurement in the future involves two conditions, namely, requiring MG and not requiring MG, the above-mentioned situation of BWP switch will also occur.

However, MG can only be configured through RRC signaling at present, while BWP switch can be indicated through DCI. Relatively speaking, BWP switch is more flexible than MG configuration. In Rel-15, it is difficult for the network to configure or deconfigure the MG according to the BWP switch, so the network may always configure the MG for the intra-frequency measurement. In that case, for those measurements that do not require MG, loss of system (terminal and network) throughput will be generated. Therefore, a more effective solution is needed to coordinate the configuration of MG to dynamically adapt to the influence of the measurement (including intra-frequency, and the possibility of introducing inter-frequency measurement in the future) that does not require the measurement gap caused by the BWP switch, thereby optimizing the throughput of the network and the terminal. In light of the above, the following technical solution of the embodiments of the disclosure is provided.

FIG. 3 is a schematic flowchart of a measurement gap determining method embodied in an embodiment of the disclosure. As shown in FIG. 3, the measurement gap determining method includes the following steps:

Step 301: The terminal receives the first configuration information and/or the second configuration information sent by the network device, wherein the first configuration information is used for the terminal to determine the first measurement gap before the BWP switch and the second measurement gap used after the BWP switch, and the second configuration information is used for the terminal to determine the first measurement gap sharing scheme used before the BWP switch and the second measurement gap sharing scheme used after the BWP switch.

In the embodiment of the disclosure, the network device is a base station, such as gNB, eNB, and so on.

In the embodiment of the disclosure, the first configuration information is a fast MG configuration adapted for BWP switch. Specifically, the first configuration information can be implemented in two ways:

Approach 1: The first configuration information includes the configuration of a plurality of measurement gap patterns, and the configuration of each measurement gap pattern includes at least one of the following: the measurement gap length, and the measurement gap repetition period.

In this way, the network device pre-configures multiple measurement gap patterns for the terminal to achieve rapid switching of the measurement gap before and after the BWP switch.

Here, in order to assist the network device in configuring the first configuration information, the terminal may send first capability information to the network device, and the first capability information is used to indicate the capability of measurement gap supported by the terminal. The network device configures a plurality of measurement gap patterns for the terminal according to the first capability information.

In an example, the network device pre-configures two (or more) MG patterns (including MGL and/or MGRP) for the terminal according to the capability, reported by the terminal, of the MG supported by the terminal. The terminal adopts MG pattern 1 (corresponding to the first measurement gap) before the BWP switch, and quickly adopts MG pattern 2 (corresponding to the second measurement gap) after the BWP switch.

Approach 2: The first configuration information includes the configuration of multiple sets of measurement gap parameters, and the configuration of each set of measurement gap parameters includes at least one of the following: the measurement gap length and the measurement gap repetition period.

In this way, the network equipment pre-configures multiple sets of measurement gap parameters for the terminal, and the effect achieved is the same as that of the Approach 1, that is, to achieve rapid switching of the measurement gap before and after the BWP switch.

Here, in order to assist the network device in configuring the first configuration information, the terminal may send first capability information to the network device, and the first capability information is used to indicate the capability of measurement gap supported by the terminal. The network device configures multiple sets of measurement gap parameters for the terminal according to the first capability information.

In an example, the network device pre-configures two (or more) sets of MG parameters (including MGL and/or MGRP) for the terminal according to the capability, reported by the terminal, of the MG supported by the terminal. The terminal adopts MG parameter 1 (such as MGL1, corresponding to the first measurement gap) before the BWP switch, and quickly adopts MG parameter 2 (such as MGL2, corresponding to the second measurement gap) after the BWP switch.

In the embodiment of the disclosure, the second configuration information supports the following configurations of multiple measurement gap sharing schemes:

Each measurement frequency layer equally splits the measurement opportunities of the measurement gap.

The intra-frequency measurement and the inter-frequency measurement equally split the measurement opportunities of the measurement gap according to a ratio, and there are multiple types of the value of the ratio.

For example: the measurement gap sharing scheme is configured with three bits, wherein 000 represents the measurement opportunity for each measurement frequency layer to equally split the measurement gap (that is, the opportunity for all frequency points to equally split the measurement gap); 001,010,011,100,101,110,111 respectively correspond to 25, 50, 75, 30, 40, 60, and 80 of the values of X. The value of X is used to determine the ratio of the measurement gap equally split by the intra-frequency measurement and the inter-frequency measurement. The ratio of the intra-frequency measurement occupying the measurement gap is $K_{intra}=1/X*100$, the ratio of the inter-frequency measurement occupying the measurement gap is $K_{inter}=1/(100-X)*100$.

It should be noted that the measurement gap sharing scheme is not limited to the configuration with 3 bits, and can also be configured with 2 bits, 4 bits, and so on.

In the embodiment of disclosure, the terminal switches from the first BWP to the second BWP in the first measurement period, and the first measurement period is divided into a first time segment and a second time segment by the BWP switch interruption. In the first time segment, the terminal determines whether the measurement of the first signal requires a measurement gap based on the positional relationship between the first BWP and the first signal. In the second time segment, the terminal determines whether measurement of the first signal requires a measurement gap based on the positional relationship between the second BWP and the first signal.

Here, the switch from the first BWP to the second BWP can include three trigger types: 1. DCI-based BWP switch; 2. Timer-based BWP switch; 3. RRC-based BWP switch.

In the embodiment of the disclosure, in the first time segment, the first BWP is in the activated state; in the first time segment, the terminal determines whether the measurement of the first signal requires a measurement gap based on the positional relationship between the first BWP and the first signal. Specifically, the conditions include: if the first signal is completely located within the first BWP or the first BWP is the initial BWP, the measurement of the first signal does not require the measurement gap; if the first signal is completely or partially located outside the first BWP, the measurement of the first signal requires a measurement gap.

In the embodiment of the disclosure, in the second time segment, the second BWP is in the activated state; in the second time segment, the terminal determines whether the measurement of the first signal requires a measurement gap based on the positional relationship between the second BWP and the first signal. Specifically, the conditions include: if the first signal is completely located within the second BWP or the second BWP is the initial BWP, the measurement of the first signal does not require the measurement gap; if the first signal is completely or partially located outside the second BWP, the measurement of the first signal requires a measurement gap.

In some optional implementations, the first signal is synchronization signal block (SSB) or channel state information reference signal (CSI-RS).

In the case where the first signal is SSB, the serving cell will determine whether the measurement in the first measurement period is the intra-frequency measurement or inter-frequency measurement according to the indication in the servingcellMO configuration, and the servingcellMO configuration includes the positional relationship of SSB and SCS relationship of the serving cell and the target cell and so on. If the center frequency point of the SSB in the serving cell and the target cell is the same as SCS, they belong to the intra-frequency measurement, otherwise they belong to the inter-frequency measurement. The terminal determines whether the measurement requires an MG according to the positional relationship between the BWP of the serving cell in the activated state and the SSB to be measured. Further, if the SSB is within the BWP or the BWP is the initial BWP, the measurement does not require the MG, and if the SSB is completely or partially located outside the BWP, the measurement requires the MG.

For example: BWP switch occurs in the intra-frequency measurement, the first measurement period is divided into two parts by the BWP switch interruption, namely the first time segment and the second time segment. According to the relationship between the position of the serving cell before and after the BWP switch and the first signal, the terminal can flexibly adjust the measurement gap before and after the switch. Specifically, referring to FIG. 4A, FIG. 4A takes the intra-frequency measurement as an example, and the first signal is SSB (the signal to be measured), and the measurement period is divided by the BWP switch interruption into the first time segment T1 and the second time segment T2. In T1, BWP1 is in the activated state, and the SSB is located within BWP1 in the frequency domain. Therefore, intra-frequency measurement in T1 does not require MG. In T2, BWP2 is in the activated state, and SSB is located outside of BWP1 in the frequency domain. Therefore, intra-frequency measurement in T2 requires MG. Refer to FIG. 4B, FIG. 4B takes the intra-frequency measurement as an example, and the first signal is SSB (the signal to be measured), and the measurement period is divided by the BWP switch interruption into the first time segment T1 and the second time segment T2. In T1, BWP2 is in the activated state, and the SSB is located outside of BWP2 in the frequency domain. Therefore, intra-frequency measurement in T1 requires MG. In T2, BWP1 is in the activated state, and the SSB is located within BWP1 in the frequency domain. Therefore, intra-frequency measurement in T2 does not require MG.

Figure 4A:
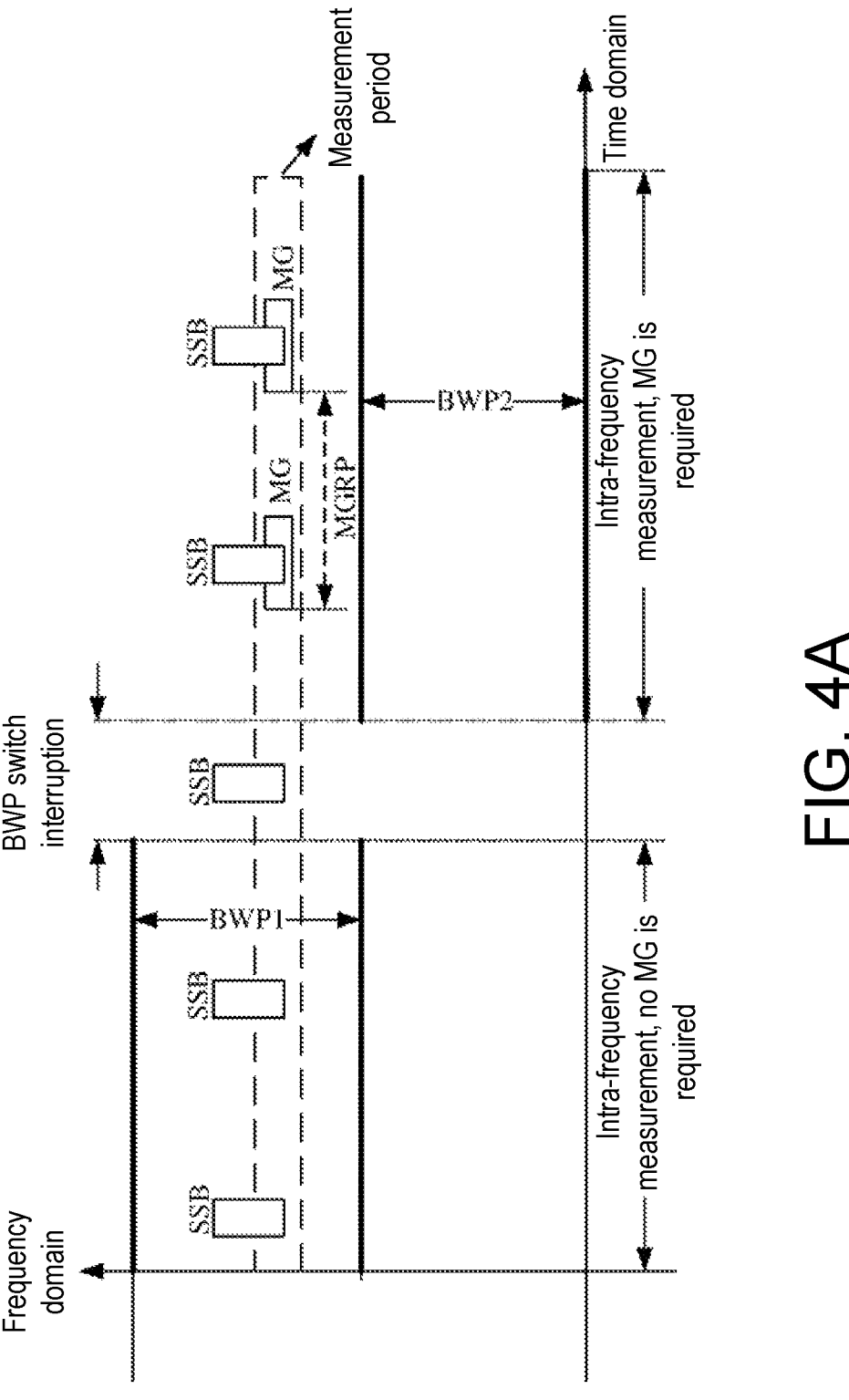
FIG. 4A is the first schematic diagram showing the MG before and after BWP switch embodied in an embodiment of the disclosure.
Figure 4B:
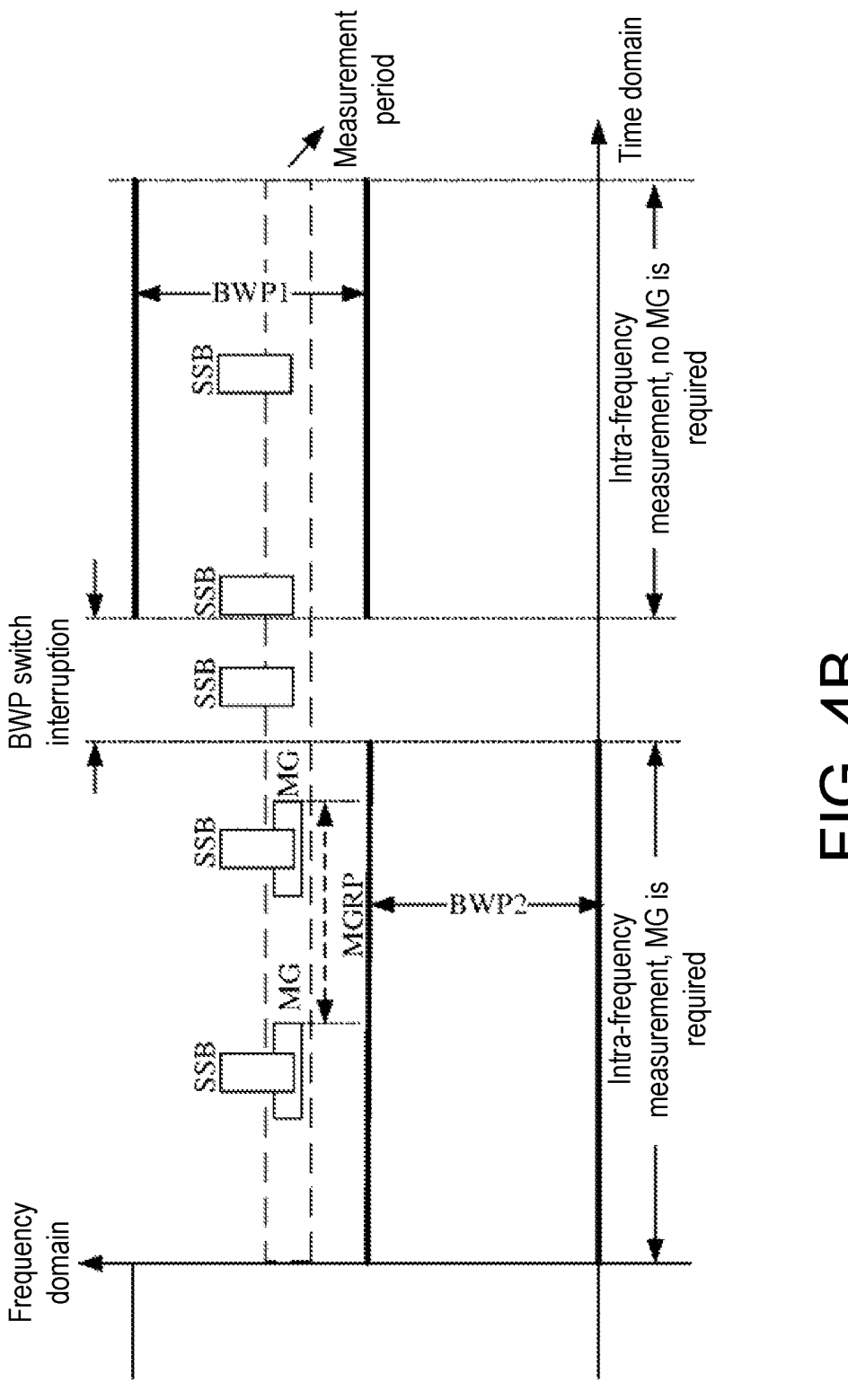
FIG. 4B is the second schematic diagram showing the MG before and after BWP switch embodied in an embodiment of the disclosure.

It can be seen from FIG. 4A and FIG. 4B that during the intra-frequency measurement, the BWP switch interruption has two effects on the measurement: 1) SSB is involved before BWP switch (the intra-frequency measurement does not require MG), and SSB is not involved after BWP switch (the intra-frequency measurement requires MG), as shown in FIG. 4A. 2) SSB is not involved before BWP switch (the intra-frequency measurement requires MG), and SSB is involved after BWP switch (the intra-frequency measurement does not require MG), as shown in FIG. 4B.

In some optional implementation, if the terminal does not support simultaneous reception of the first signal and data, for the condition that the measurement gap is not required for the measurement of the first signal, the terminal cannot transmit signals in the timing window where the first signal is located.

In some optional implementation, if the terminal does not support simultaneous reception of the first signal and data, for the condition that the measurement gap is not required for the measurement of the first signal, the terminal cannot transmit signals in the timing window where the first signal is located, as well as n1 symbols before the first signal and n2 symbols after the first signal, and n1 and n2 are positive integers.

For example, if the terminal does not support simultaneous reception of SSB and data, for measurements that do not require MG, the terminal needs to be restricted from transmitting signals within SS/PBCH block measurement timing configuration (SMTC) window and 1 symbol (i.e., n1=n2=1) before and after SSB.

In some optional implementation, for the condition where a measurement gap is required for the measurement of the first signal, the terminal cannot transmit signals other than measurement within the measurement gap.

In the embodiment of the disclosure, before the BWP switch, the first measurement gap and/or the first measurement gap sharing scheme is determined according to whether the measurement gap is required before the BWP switch; after the BWP switch, the second measurement gap and/or the second measurement gap sharing scheme is determined according to whether a measurement gap is required after the BWP switch. Specifically, the terminal determines the first measurement gap before the BWP switch and the second measurement gap after the BWP switch from the first configuration information according to the first indication information, and/or, determines the first measurement gap sharing scheme before BWP switch and the second measurement gap sharing scheme after BWP switch from the second configuration information according to the second indication information. In an optional implementation, the first indication information is carried in a downlink control information DCI or a radio resource control RRC message. The second indication information is carried in the DCI or RRC message. Further, the DCI or RRC message also carries third indication information, and the third indication information is used to indicate the terminal to switch from the first BWP switch to the second BWP. The following is a detailed description in conjunction with specific application examples.

Example 1: The Network Device Uses the First Indication Information to Quickly Reconfigure the Measurement Gap for the Terminal According to the BWP Switch Referring to FIG. 4A, BWP switch causes the intra-frequency measurement of the serving cell to change from not requiring MG before switch to requiring MG after switch. For per-UE or per-FR gaps, the number of frequency layers (that is, frequency points) of the intra-frequency, inter-frequency and other types of measurement that need to be measured in the gap increases. Accordingly, network device can quickly adjust and configure a new MG (that is, indicating the second measurement gap through the first indication information) to adapt to the scenario after the BWP switch, such as MG with a longer measurement gap length (MGL) (such as Gap 2 to Gap 0), and/or MG with a shorter measurement gap repetition period (MGRP). Here, MG with a shorter MGRP corresponds to denser MG (such as Gap11 of 160 ms to Gap4 of 20 ms).

Referring to FIG. 4B, BWP switch causes the intra-frequency measurement of the serving cell to change from requiring MG before switch to not requiring MG after switch. For per-UE or per-FR gaps, the number of frequency layer (i.e. frequency points) that needs to be measured in the gap is reduced. Accordingly, the network device can quickly adjust and configure a new MG (that is, indicate the second measurement gap through the first indication information) to adapt to the scenario after BWP switch, such as MG with a shorter MGL, and/or, MG with a longer MGRP. Here, the MG with a longer MGRP corresponds to a sparser MG.

In an example, the measurement gap pattern or measurement gap parameter used by the terminal before and after the BWP switch is determined based on the first indication information sent by the network device, and the first indication information may be carried in the DCI or RRC message. Specifically, if the BWP switch is triggered based on the DCI, the measurement gap pattern or measurement gap parameters that need to be reconfigured can be indicated in the DCI simultaneously (that is, the first indication information is carried in the DCI).

The implementation of the first indication information will be described in detail below. The first indication information may be used to indicate whether to perform measurement gap reconfiguration.

The first indication information is carried in the DCI. The first indication information carries information about the measurement gap configured for the terminal, such as an identification of a measurement gap pattern, or a collection of measurement gap parameters.

In some optional implementation, the first indication information may be a PDCCH, a sequence, or a combination of the two.

In some optional implementation, the first indication information may be sent periodically.

In some optional implementation, the period of the first indication information may be greater than or equal to the monitoring period of the PDCCH (that is, the period of the search space of the PDCCH).

In some optional implementation, the first indication information may use 1 bit to indicate whether the measurement gap of the terminal needs to be changed. For example, if the first indication information is DCI, the 1 bit in the DCI may be used to indicate whether the measurement gap needs to be changed.

In some optional implementation, the first indication information may use one sequence to indicate that the measurement gap of the terminal needs to be changed, and use another sequence to indicate that the measurement gap of the terminal does not need to be changed.

In some optional implementation, the first indication information may use N1 bits to indicate the identification (ID) of the measurement gap pattern of the terminal. For example, N1=2, 2 bits can indicate 4 kinds of IDs. If 00 indicates 0, 01 indicates 1, 10 indicates 4, and 11 indicates 5, 4 IDs can be indicated. The change between IDs can achieve the following: 1) MGL is unchanged, MGRP is changed (that is, the sparsity of MG is changed), and/or MGRP is unchanged (the sparsity of MG is unchanged), and the MGL of MG is changed.

In some optional implementation, in the first indication information, an N2 bitmap may be used to indicate the ID of measurement gap pattern of the terminal. For example, N2=24, 24 bits can indicate 0 to 23 ID sets. For example, 000000000000000000000001 indicates 0, 000000000000000000000010 indicates 1, and 100000000000000000000000 indicates 23, that is, the position of the 1 indicates the number of ID. Alternatively, for UE that supports per FR1/FR2 gap, only no more than 12 IDs are configured, and the corresponding bit number is not greater than 12. Table 6 shows the relationship between 24 IDs of measurement gap pattern and MGL as well as MGRP.

TABLE 6

| Gap Pattern Id | Measurement Gap Length (MGL, ms) | Measurement Gap Repetition Period (MGRP, ms) |
|---|---|---|
| 0 | 6 | 40 |
| 1 | 6 | 80 |
| 2 | 3 | 40 |
| 3 | 3 | 80 |
| 4 | 6 | 20 |
| 5 | 6 | 160 |
| 6 | 4 | 20 |
| 7 | 4 | 40 |
| 8 | 4 | 80 |
| 9 | 4 | 160 |
| 10 | 3 | 20 |
| 11 | 3 | 160 |
| 12 | 5.5 | 20 |
| 13 | 5.5 | 40 |
| 14 | 5.5 | 80 |
| 15 | 5.5 | 160 |
| 16 | 3.5 | 20 |
| 17 | 3.5 | 40 |
| 18 | 3.5 | 80 |
| 19 | 3.5 | 160 |
| 20 | 1.5 | 20 |
| 21 | 1.5 | 40 |
| 22 | 1.5 | 80 |
| 23 | 1.5 | 160 |

Similarly, if the first indication information is in a sequence, different sequences may be used to indicate information about the measurement gap of the terminal. For example, suppose there are 4 kinds of sequences, wherein sequence 1 indicates that the measurement gap pattern ID is 0, sequence 2 indicates that the measurement gap pattern ID is 1, sequence 3 indicates that the measurement gap pattern ID is 4, and sequence 4 indicates that the measurement gap pattern ID is 5.

It should be noted that the first indication information may be carried in the PDCCH for the uplink/downlink authorization of the scheduling terminal, and the first indication information is carried in the bit field in the PDCCH.

The first indication information is carried in the RRC message. The first indication information carries information about the measurement gap configured for the terminal, such as an identification of a measurement gap pattern, or a collection of measurement gap parameters.

Here, the first indication information is configured in the RRC parameter MeasGapConfig. The first indication information can also be an N1 bit or N2 bitmap.

In some optional implementation, the first indication information may use N1 bits to indicate the identification (ID) of the measurement gap pattern of the terminal. For example, N1=2, 2 bits can indicate 4 kinds of IDs. If 00 indicates 0, 01 indicates 1, 10 indicates 4, and 11 indicates 5, 4 IDs can be indicated. The change between IDs can achieve the following: 1) MGL is unchanged, MGRP is changed (that is, the sparsity of MG is changed), and/or MGRP is unchanged (the sparsity of MG is unchanged), and the MGL of MG is changed.

In some optional implementation, in the first indication information, an N2 bitmap may be used to indicate the ID of measurement gap pattern of the terminal. For example, N2=24, 24 bits can indicate 0 to 23 ID sets. For example, 000000000000000000000001 indicates 0, 000000000000000000000010 indicates 1, and 100000000000000000000000 indicates 23, that is, the position of the 1 indicates the number of ID. Alternatively, for UE that supports per FR1/FR2 gap, only no more than 12 IDs are configured, and the corresponding bit number is not greater than 12.

In addition, the configuration of the first configuration information by the network device can adopt the current process of configuring MG in network, which is suitable for DCI-based BWP switch, timer-based BWP switch, and RRC-based BWP switch.

Figure 5:
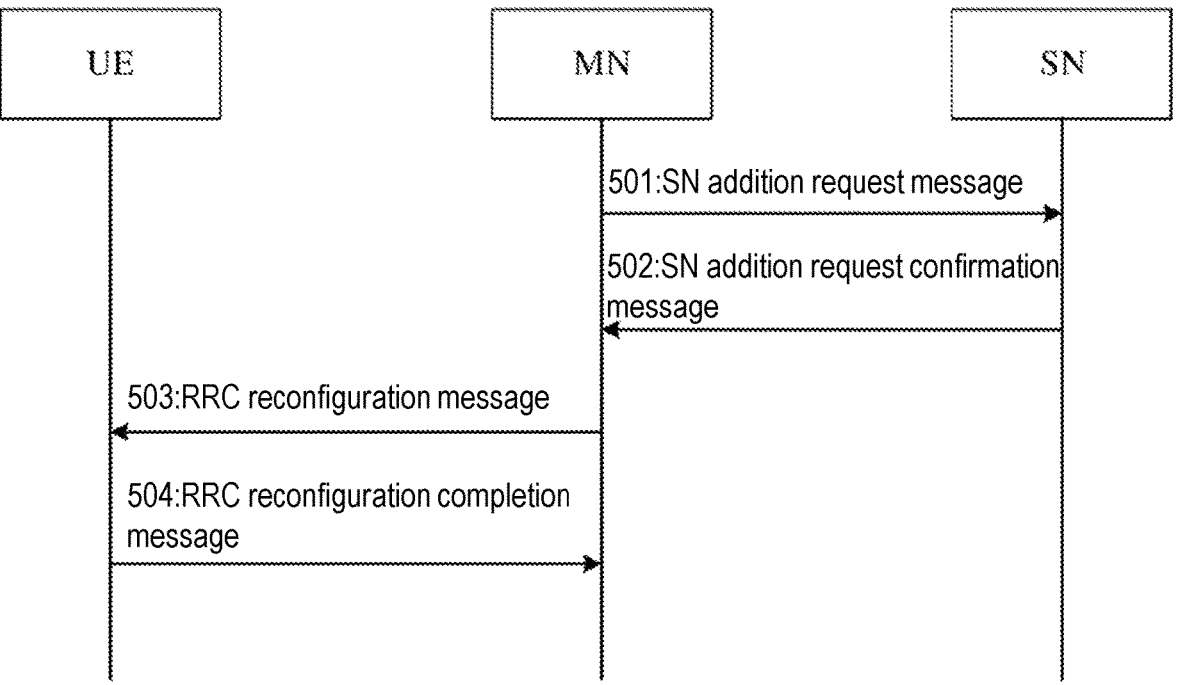
FIG. 5 is a flowchart showing addition of an SN node embodied in an embodiment of the disclosure.

For the RRC configuration method, please refer to FIG. 5. FIG. 5 is a flow chart for adding SN nodes. The configuration of the first configuration information can be implemented through this process. As shown in FIG. 5, the process includes the following steps:

Step 501: The MN sends an SN addition request message to the SN.

Step 502: The SN sends an SN addition request confirmation message to the MN.

Step 503: The MN sends an RRC reconfiguration message to the UE.

Here, the RRC reconfiguration message carries the first configuration information.

Step 504: The UE sends an RRC reconfiguration completion message to the MN.

For the DCI configuration method, it is necessary to modify the design of existing DCI format, or introduce a new DCI format, and the DCI delivery process at the physical layer is consistent with that in the existing method.

Example 2: The Network Device Uses the Second Indication Information to Quickly Reconfigure the Measurement Gap Sharing Scheme for the Terminal According to the BWP Switch The current measurement gap sharing scheme only supports 4 configurations. Specifically, the measurement gap sharing scheme is configured with two bits, wherein 00 represents the opportunities that all frequency points will split the measurement gap equally; 01, 10, and 11 respectively correspond to 25, 50 and 75 of the values of X. The value of X is used to determine the ratio of the intra-frequency measurement and the inter-frequency measurement occupying measurement gap. The ratio of the intra-frequency measurement occupying the measurement gap is $K_{intra}=1/X*100$, and the ratio of the inter-frequency measurement occupying the measurement gap is $K_{inter}=1/(100-X)*100$.

In an example, the measurement gap sharing scheme adopted by the terminal before and after the BWP switch is determined based on the second indication information sent by the network device, and the second indication information may be carried in the DCI or RRC message.

The implementation of the second indication information will be described in detail below. The second indication information may be used to indicate whether to perform reconfiguration of the measurement gap sharing scheme.

The second indication information is carried in the DCI, and the measurement gap sharing scheme configured for the terminal is carried in the second indication information (such as parameter X, the value of X is used to determine the ratio of the intra-frequency measurement and inter-frequency measurement occupying the measurement gap).

In some optional implementation, the second indication information may be PDCCH, a sequence, or a combination of the two.

In some optional implementation, the second indication information may be sent periodically.

In some optional implementation, the period of the second indication information may be greater than or equal to the monitoring period of the PDCCH (that is, the period of the search space of the PDCCH).

In some optional implementation, the existing 4 measurement gap sharing schemes are kept unchanged, but an indication is added to the DCI.

In some optional implementation, the second indication information may use 1 bit to indicate whether the measurement gap sharing scheme of the terminal needs to be changed.

In some optional implementation, the second indication information may use one sequence to indicate that the measurement gap sharing scheme of the terminal needs to be changed, and use another sequence to indicate that the measurement gap sharing scheme of the terminal does not need to be changed.

In some optional implementation, the second indication information may use X bits to indicate the measurement gap sharing scheme of the terminal. For example, 2 bits may indicate 4 types in some optional implementation, as shown in Table 7 below. There can also be more bits, that is, take a partial subset of them, or add a measurement gap sharing scheme, as shown in Table 8 below.

TABLE 7

| measGapSharingScheme | Value of X (%) |
| --- | --- |
| '00' | Equal splitting |
| '01' | 25 |
| '10' | 50 |
| '11' | 75 |

TABLE 8

| measGapSharingScheme | Value of X (%) |
| --- | --- |
| '000' | Equal splitting |
| '001' | 25 |
| '010' | 50 |
| '011' | 75 |
| '101' | 15 |
| '110' | 40 |
| '111' | 65 |

Similarly, if the second indication information adopts a sequential indication, different sequences may be used to indicate the measurement gap sharing scheme of the terminal. For example, suppose there are 4 kinds of sequences, wherein sequence 1 indicates measurement gap sharing scheme 00, sequence 2 indicates measurement gap sharing scheme 01, sequence 3 indicates measurement gap sharing scheme 10, and sequence 4 indicates measurement gap sharing scheme 11.

The second indication information is carried in the RRC message, and the measurement gap sharing scheme configured for the terminal is carried in the second indication information (such as parameter X, the value of X is used to determine the ratio of the intra-frequency measurement and inter-frequency measurement occupying the measurement gap).

Here, the second indication information is configured in the RRC parameter MeasGapSharingScheme. The second indication information can also be X bits or a bitmap.

In the second indication information, X bits may be used to indicate the measurement gap sharing scheme of the terminal. For example, 2 bits may indicate 4 types in some optional implementation, as shown in Table 7 above. There can also be more bits, that is, take a partial subset of them, or a measurement gap sharing scheme is added, as shown in Table 8 above.

In this example, the measurement gap sharing scheme is enhanced as follows. It should be noted that the following two enhancement schemes can be implemented separately or in combination.

Enhancement scheme 1: a new configuration scheme is introduced for the measurement gap sharing scheme, that is, to expand the number of ratio of intra-frequency measurement and inter-frequency measurement occupying the measurement gap. For example, the measurement gap sharing scheme is configured with three bits, wherein 000 represents the measurement opportunity for each measurement frequency layer to equally split the measurement gap (that is, the opportunity for all frequency points to equally split the measurement gap); 001, 010, 011, 100, 101, 110, 111 respectively correspond to 25, 50, 75, 30, 40, 60 and 80 of the values of X. The value of X is used to determine the ratio of intra-frequency measurement and inter-frequency measurement equally splitting the measurement gap. The ratio of the intra-frequency measurement occupying the measurement gap is $K_{intra}=1/X*100$, and the ratio of the inter-frequency measurement occupying the measurement gap is $K_{inter}=1/(100-X)*100$. It should be noted that the measurement gap sharing scheme is not limited to the configuration with 3 bits, and can also be configured with 2 bits, 4 bits, and so on.

When the MG is not required for intra-frequency measurement in the frequency layer of some serving cells, the total gap time allocated to intra-frequency measurement can be optimized and reduced accordingly, that is, fewer intra-frequency measurements are configured to occupy the measurement gap. Otherwise, more intra-frequency measurements are configured to occupy the measurement gap.

It should be noted that the enhancement scheme 1 is applicable to DCI-based BWP switch, timer-based BWP switch, and RRC-based BWP switch.

Enhancement scheme 2: For DCI-based BWP switch or RRC-based BWP switch, the DCI or RRC signaling is not only used to indicate the BWP switch, but also can indicate the measurement gap sharing scheme.

It should be noted that the enhancement scheme 2 is applicable to DCI-based BWP switch and RRC-based BWP switch.

It should be noted that most of the above examples are based on the first signal being SSB. In addition, the first signal may also be CSI-RS, and the above examples applicable to SSB are also applicable to CSI-RS. The difference is that the definitions of intra-frequency measurement and inter-frequency measurement are slightly different in SSB and CSI-RS measurements. For SSB, if the center frequency point of the SBB of the serving cell and the SSB of the target cell are the same as the SCS, the measurement of the SSB of the target cell belongs to the intra-frequency measurement; otherwise, the measurement of the SSB of the target cell belongs to the inter-frequency measurement. For CSI-RS, the CSI-RS of the target cell is included in the CSI-RS of the serving cell, and the SCS of the target cell and the serving cell are the same, then the measurement of the CSI-RS of the target cell belongs to the intra-frequency measurement; otherwise, the measurement of the CSI-RS of the target cell belongs to the inter-frequency measurement. Therefore, for CSI-RS measurement, similarly, it is only necessary to determine whether the CSI-RS before and after the BWP switch is in the activated BWP of the serving cell, so as to determine whether to adjust MG and/or adjust MG sharing scheme.

Figure 6:
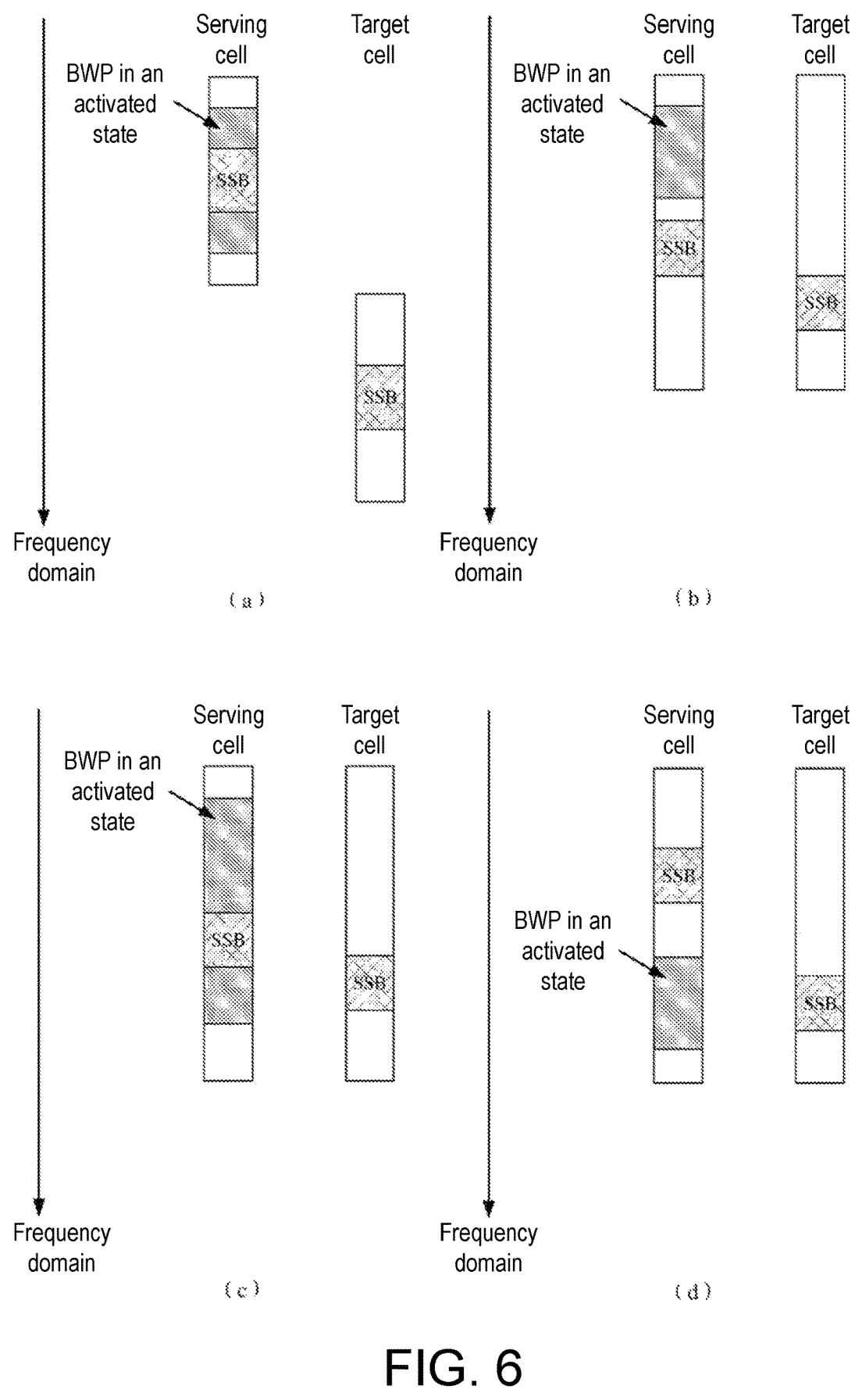

It should be noted that most of the above examples are based on the measurement of the first signal belonging to the intra-frequency measurement. In addition, the measurement of the first signal may also belong to the inter-frequency measurement. The above examples applicable to the intra-frequency measurement are also applicable to inter-frequency measurement. It should be pointed out that the current protocol stipulates that for inter-frequency measurement, the terminal must be configured with MG. In the embodiment of this disclosure, for inter-frequency measurement, if the SSB for the target cell is still in the activated BWP of the serving cell, the inter-frequency measurement may not need to configure MG. Specifically, as shown in (a), (b) of FIG. 6, inter-frequency measurement requires MG; as shown in (c), (d) of FIG. 6, MG is not required for inter-frequency measurement.

Figure 7:
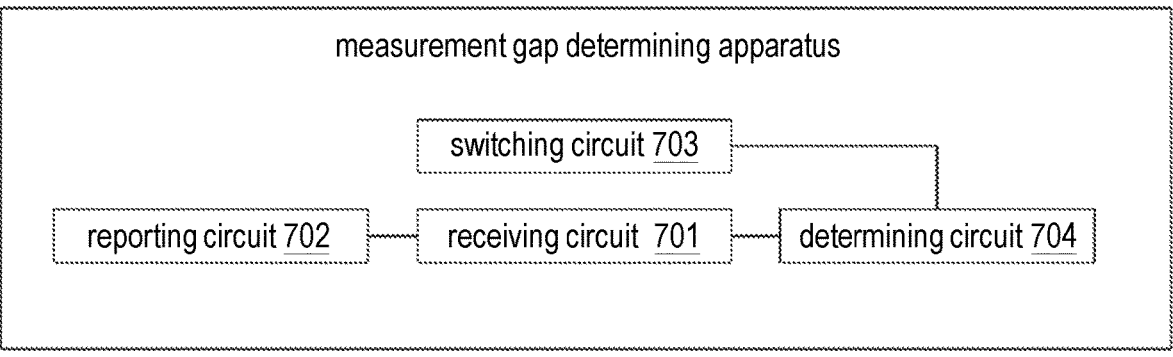
FIG. 7 is a schematic diagram of a structural constitution of a measurement gap determining apparatus embodied in an embodiment of the disclosure.

FIG. 7 is a schematic diagram of a structural constitution of a measurement gap determining apparatus embodied in an embodiment of the disclosure. As shown in FIG. 7, the measurement gap determining apparatus includes:

The receiving circuit 701 is configured to receive first configuration information and/or second configuration information sent by a network device; the first configuration information is used for the terminal to determine the first measurement gap used before BWP switch and the second measurement gap used after BWP switch. The second configuration information is used for the terminal to determine the first measurement gap sharing scheme used before BWP switch and the second measurement gap sharing scheme used after BWP switch.

In an embodiment, the first configuration information includes the configuration of a plurality of measurement gap patterns, and the configuration of each measurement gap pattern includes at least one of the following: a measurement gap length and a measurement gap repetition period.

In an embodiment, the first configuration information includes the configuration of multiple sets of measurement gap parameters, and the configuration of each set of measurement gap parameters includes at least one of the following: a measurement gap length and a measurement gap repetition period.

In an embodiment, the apparatus further includes:

The reporting circuit 702 is configured to send first capability information to a network device, and the first capability information is used to indicate the capability of measurement gap supported by the terminal.

In an embodiment, the second configuration information supports the following configurations of multiple types of measurement gap sharing schemes.

Each measurement frequency layer equally splits the measurement opportunities of the measurement gap.

The intra-frequency measurement and the inter-frequency measurement equally split the measurement opportunities of the measurement gap according to a ratio, and there are multiple types of the value of the ratio.

In an embodiment, the apparatus further includes:

The switching circuit 703 is configured to switch from the first BWP switch to the second BWP in the first measurement period, and the first measurement period is divided into a first time segment and a second time segment by the BWP switch interruption.

The determining circuit 704 is configured to determine whether the measurement of the first signal requires a measurement gap based on the positional relationship between the first BWP and the first signal in the first time segment, and in the second time segment, configured to determine whether the measurement of the first signal requires a measurement gap based on the positional relationship between the second BWP and the first signal.

In an embodiment, in the first time segment, the first BWP is in the activated state; if the first signal is completely located within the first BWP or the first BWP is the initial BWP, the measurement of the first signal does not require the measurement gap; if the first signal is completely or partially located outside the first BWP, the measurement of the first signal requires a measurement gap.

In an embodiment, in the second time segment, the second BWP is in the activated state; if the first signal is completely located within the second BWP or the second BWP is the initial BWP, the measurement of the first signal does not require the measurement gap; if the first signal is completely or partially located outside the second BWP, the measurement of the first signal requires a measurement gap.

In an embodiment, the apparatus further includes: a communication circuit.

If the communication circuit does not support simultaneous reception of the first signal and data, for the condition that the measurement gap is not required for the measurement of the first signal, the communication circuit cannot transmit signals within the timing window where the first signal is located.

In an embodiment, the apparatus further includes: a communication circuit.

If the communication circuit does not support simultaneous reception of the first signal and data, for the condition that the measurement gap is not required for the measurement of the first signal, the communication circuit cannot transmit signals in the timing window where the first signal is located, as well as n1 symbols before the first signal and n2 symbols after the first signal, and n1 and n2 are positive integers.

In an embodiment, the apparatus further includes: a communication circuit.

For the condition that a measurement gap is required for the measurement of the first signal, the communication circuit cannot transmit signals other than measurement within the measurement gap.

In an embodiment, the first measurement gap and/or the first measurement gap sharing scheme is determined according to whether the measurement gap is required before the BWP switch; the second measurement gap and/or the second measurement gap sharing scheme is determined according to whether a measurement gap is required after the BWP switch.

The apparatus further includes: a determining circuit 704 which is configured to determine a first measurement gap before the BWP switch and a second measurement gap after the BWP switch from the first configuration information according to the first indication information, and/or, to determine the first measurement gap sharing scheme before the BWP switch and the second measurement gap sharing scheme after the BWP switch from the second configuration information according to the second indication information.

In an embodiment, the first indication information is carried in a DCI or RRC message.

In an embodiment, the second indication information is carried in a DCI or RRC message.

In an embodiment, the DCI or RRC message further carries third indication information, and the third indication information is used to indicate the terminal to switch from the first BWP switch to the second BWP.

In an embodiment, the first signal is SSB or CSI-RS.

In an embodiment, the measurement of the first signal belongs to the intra-frequency measurement; or, the measurement of the first signal belongs to the inter-frequency measurement.

Those skilled in the art should understand that the description related to the measurement gap determining apparatus in the embodiment of the disclosure can be inferred from the description related to the measurement gap determining method in the embodiment of the disclosure.

Figure 8:
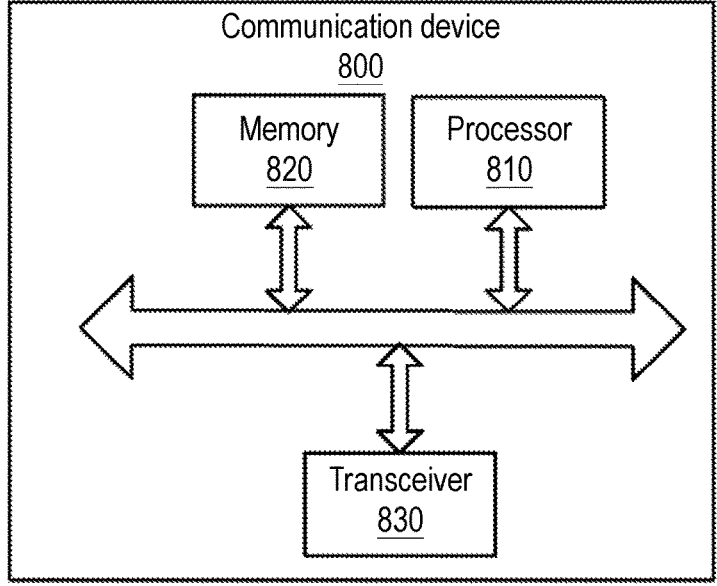
FIG. 8 is a schematic structural diagram of a communication device embodied in an embodiment of the disclosure.

FIG. 8 is a schematic structural diagram of a communication device 800 embodied in an embodiment of the disclosure. The communication device can be a terminal or a network device. The communication device 800 shown in FIG. 8 includes a processor 810. The processor 810 can invoke and run a computer program in the memory to implement the method in the embodiment of the disclosure.

Optionally, as shown in FIG. 8, the communication device 800 may further include a memory 820. The processor 810 can invoke and run a computer program in the memory 820 to implement the method in the embodiment of the disclosure.

The memory 820 may be a separate device independent of the processor 810, or may be integrated in the processor 810.

Optionally, as shown in FIG. 8, the communication device 800 may further include a transceiver 830, and the processor 810 may control the transceiver 830 to communicate with other devices. Specifically, the transceiver 830 may send information or data to other devices, or receive information or data sent by other devices.

Specifically, the transceiver 830 may include a transmitter and a receiver. The transceiver 830 may further include an antenna, and the number of antennas may be one or more.

Optionally, the communication device 800 may specifically be a network device in an embodiment of the disclosure, and the communication device 800 may implement the corresponding process implemented by the network device in various methods of the embodiments of the disclosure. For conciseness, no further description is incorporated herein.

Optionally, the communication device 800 may specifically be a mobile terminal/terminal according to an embodiment of the disclosure, and the communication device 800 may implement the corresponding process implemented by the mobile terminal/terminal in various methods of the embodiments of the disclosure. For conciseness, no further description is incorporated herein.

Figure 9:
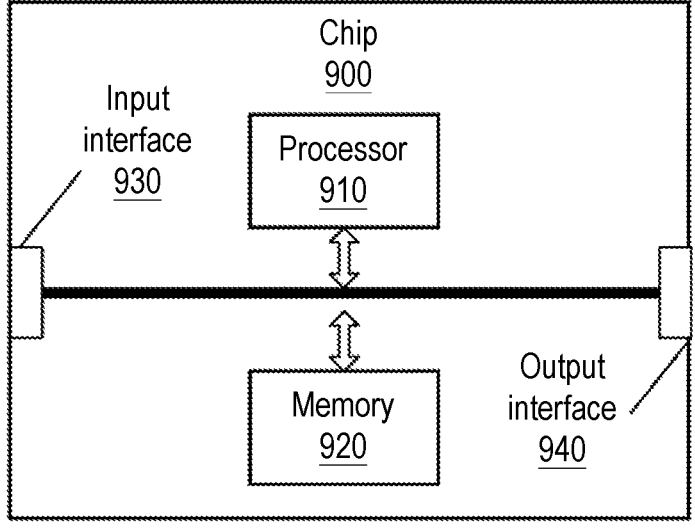
FIG. 9 is a schematic structural diagram of a chip embodied in an embodiment of the disclosure.

FIG. 9 is a schematic structural diagram of a chip embodied in an embodiment of the disclosure. The chip 900 shown in FIG. 9 includes a processor 910, and the processor 910 can invoke and run a computer program in the memory to implement the method in the embodiment of the disclosure.

Optionally, as shown in FIG. 9, the chip 900 may further include a memory 920. The processor 910 can invoke and run a computer program in the memory 920 to implement the method in the embodiment of the disclosure.

The memory 920 may be a separate device independent of the processor 910, or may be integrated in the processor 910.

Optionally, the chip 900 may further include an input interface 930. The processor 910 can control the input interface 930 to communicate with other devices or chips.

Specifically, the input interface 930 can obtain information or data sent by other devices or chips.

Optionally, the chip 900 may further include an output interface 940. The processor 910 can control the output interface 940 to communicate with other devices or chips. Specifically, the output interface 940 can output information or data to other devices or chips.

Optionally, the chip can be applied to the network device in the embodiments of the disclosure, and the chip can implement the corresponding processes implemented by the network device in the various methods of the embodiments of the disclosure. For conciseness, no further details are not incorporated herein.

Optionally, the chip can be applied to the mobile terminal/terminal in the embodiment of the disclosure, and the chip can implement the corresponding process implemented by the mobile terminal/terminal in various methods of the embodiments of the disclosure. For conciseness, no further details are not incorporated herein.

It should be understood that the chip mentioned in the embodiments of the disclosure may also be referred to as a system-level chip, a system chip, a chip system, or a system-on-chip.

Figure 10:
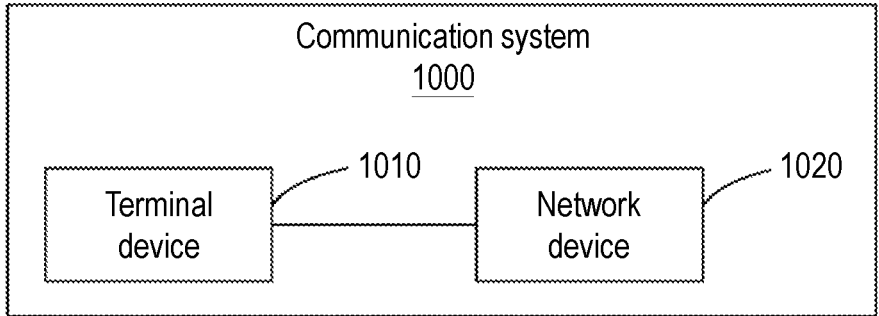
FIG. 10 is a schematic block diagram of a communication system embodied in an embodiment of the disclosure.

FIG. 10 is a schematic block diagram of a communication system 1000 embodied in an embodiment of the disclosure. As shown in FIG. 10, the communication system 1000 includes a terminal 1010 and a network device 1020.

Specifically, the terminal 1010 can be used to implement the corresponding functions implemented by the terminal in the above method, and the network device 1020 can be used to implement the corresponding functions implemented by the network device in the above method. For conciseness, no further details are not incorporated herein.

It should be understood that the processor of the embodiment of the disclosure may be an integrated circuit chip, which has signal processing capabilities. In the implementation process, the steps of the above method embodiments can be completed by integrated logic circuits of hardware in the processor or instructions in the form of software. The processor may be a general-purpose processor, a Digital Signal Processor (DSP), an Application Specific Integrated Circuit (ASIC), an on-shelf Field Programmable Gate Array (FPGA), or other programmable logic devices, discrete gates or transistor logic devices, discrete hardware components. The methods, steps, and logical block diagrams disclosed in the embodiments of the disclosure can be implemented or executed. The general-purpose processor may be a microprocessor or the processor may also be any conventional processor or the like. The steps of the method disclosed in the embodiments of the disclosure can be directly embodied as being executed by a hardware decoding processor, or executed by a combination of hardware and software modules in the decoding processor. The software module can be located in random memory, flash memory, read-only memory, programmable read-only memory, or electrically readable and writable programmable memory, registers, and other well-developed storage media in the field. The storage medium is located in the memory, and the processor reads the information in the memory and completes the steps of the above method in combination with its hardware.

It can be understood that the memory in the embodiments of the disclosure may be volatile memory or non-volatile memory, or may include both volatile and non-volatile memory. Specifically, non-volatile memory can be Read-Only Memory (ROM), Programmable ROM (PROM), Erasable PROM (EPROM), Electrically EPROM (EEPROM) or flash memory. The volatile memory may be a Random Access Memory (RAM), which is used as an external cache memory. By way of exemplary but not restrictive description, many forms of RAM may be adopted, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM) and Direct Rambus RAM (DR RAM). It should be noted that the memory of the systems and methods described herein is intended to include but not limited to these and any other types of memory applicable.

It should be understood that the above-mentioned memory is exemplary but not limited thereto. For example, the memory in the embodiment of the disclosure may also be static RAM (SRAM), dynamic RAM (DRAM), synchronous DRAM (SDRAM), double data rate SDRAM (DDR SDRAM), enhanced SDRA (ESDRAM), synch link DRAM (SLDRAM), and Direct Rambus RAM (DR RAM), etc. That is to say, the memory in the embodiments of the disclosure is intended to include but not limited to these and any other types of memory applicable.

The embodiment of the disclosure further provides a computer-readable storage medium for storing computer programs.

Optionally, the computer-readable storage medium can be applied to the network device in the embodiment of the disclosure, and the computer program enables the computer to execute the corresponding process implemented by the network device in various methods of the embodiments of the disclosure. For conciseness, no further details are incorporated herein.

Optionally, the computer-readable storage medium can be applied to the mobile terminal/terminal in the embodiment of the disclosure, and the computer program enables the computer to execute the corresponding process implemented by the mobile terminal/terminal in various methods of the embodiments of the disclosure. For conciseness, no further details are incorporated herein.

The embodiment of the disclosure further provides a computer program product, including computer program instructions.

Optionally, the computer program product can be applied to the network device in the embodiment of this disclosure, and the computer program instructions enable the computer to execute the corresponding process implemented by the network device in various methods of the embodiments of this disclosure. For conciseness, no further details are incorporated herein.

Optionally, the computer program product can be applied to the mobile terminal/terminal in the embodiment of this disclosure, and the computer program instructions enable the computer to execute the corresponding process implemented by the mobile terminal/terminal in various methods of the embodiments of this disclosure. For conciseness, no further details are incorporated herein.

The embodiment of the disclosure further provides a computer program.

Optionally, the computer program can be applied to the network device in the embodiment of the disclosure. When the computer program is run on the computer, the computer executes the corresponding processes implemented by the network device in the various methods of the embodiments of the disclosure. For conciseness, no further details are incorporated herein.

Optionally, the computer program can be applied to the mobile terminal/terminal in the embodiment of this disclosure. When the computer program is run on the computer, the computer can execute the corresponding process implemented by the mobile terminal/terminal in various methods of the embodiments of this disclosure. For conciseness, no further details are incorporated herein.

Those of ordinary skill in the art may realize that the units and algorithm steps described in the examples in combination with the embodiments disclosed herein can be implemented by electronic hardware or a combination of computer software and electronic hardware. Whether these functions are implemented in the form of hardware or software depends on the specific application and design conditions of the technical solution. Practitioners in the art can use different methods to implement the described functions for each specific application, but such implementation should not be construed as extending beyond the scope of this disclosure.

Those skilled in the art can clearly understand that, for the convenience and conciseness of description, the specific operating process of the system, apparatus and unit described above can be derived from the corresponding process in the foregoing method embodiment, and no further description is incorporated herein.

In the several embodiments provided in this disclosure, it should be understood that the system, apparatus, and method disclosed herein may be implemented in other ways. For example, the apparatus embodiments described above are merely illustrative. For example, the division of the units is only a division of logical function, and there may be other divisions in actual implementation, for example, multiple units or elements may be combined or may be integrated into another system, or some features can be ignored or not implemented. In addition, the mutual coupling or direct coupling or communication connection that is shown or discussed may be indirect coupling or communication connection through some interfaces, apparatus or units, and may be in electrical, mechanical or other forms.

The units described as separate components may or may not be physically separated, and the components shown as units may or may not be physical units, that is, they may be located in a place, or they may be distributed to multiple network units. Some or all of the units may be selected according to actual needs to achieve the purpose of the solutions of the embodiments.

In addition, the functional units in various embodiments of the disclosure may be integrated into one processing unit, or each unit may exist alone physically, or two or more units may be integrated into one unit.

If the function is implemented in the form of a software functional unit and sold or used as an independent product, it can be stored in a computer readable storage medium. Based on this understanding, the technical solution of the disclosure essentially or the part that contributes to the existing technology or the part of the technical solution can be embodied in the form of a software product. The computer software product is stored in a storage medium, including several instructions which are used to enable a computer device (which may be a personal computer, a server, or a network device, etc.) to execute all or part of the steps of the methods described in the various embodiments of the disclosure. The aforementioned storage medium includes: U disk, removable hard disk, Read-Only Memory (ROM), Random Access Memory (RAM), magnetic disks or optical disks, etc., which can store program codes.

The above are only specific implementations of this application, but the scope to be protected by this disclosure is not limited thereto. Any person skilled in the art can easily think of changes or substitutions within the technical scope disclosed in this disclosure, and the changes or substitutions should fall within the scope to be protected by the disclosure. Therefore, the scope to be protected by the disclosure shall be subject to the scope of claims.

What is claimed is:

1. A measurement gap determining method, the method comprising:

a terminal receiving first configuration information and/or second configuration information sent by a network device, wherein the first configuration information is used for the terminal to determine a first measurement gap used before a bandwidth part (BWP) switch and a second measurement gap used after the BWP switch, and the second configuration information is used for the terminal to determine a first measurement gap sharing scheme used before the BWP switch and a second measurement gap sharing scheme used after the BWP switch, wherein the terminal switches from a first BWP to a second BWP in a first measurement period, and the first measurement period is divided into a first time segment and a second time segment by a BWP switch interruption;

wherein:

in the first time segment, the first BWP is in an activated state;

if a first signal is completely located within the first BWP or the first BWP is an initial BWP, the measurement of the first signal does not require the measurement gap; or if the signal is completely or partially located outside the first BWP, the measurement of the first signal requires the measurement gap;

wherein:

in the second time segment, the terminal determines whether the measurement of the first signal requires the measurement gap based on a positional relationship between the second BWP and the first signal;

in the second time segment, the second BWP is in an activated state;

the step of the terminal determining, in the second time segment, whether the measurement of the first signal requires the measurement gap based on the positional relationship between the second BWP and the first signal comprises:

if the first signal is completely located within the second BWP or the second BWP is an initial BWP, the measurement of the first signal does not require the measurement gap;

if the first signal is completely or partially located outside the second BWP, the measurement of the first signal requires the measurement gap;

wherein the method further comprises:

if the terminal does not support simultaneous reception of the first signal and data, for the condition that the measurement gap is not required for the measurement of the first signal, the terminal cannot transmit signals in a timing window where the first signal is located; or if the terminal does not support simultaneous reception of the first signal and data, for the condition that the measurement gap is not required for the measurement of the first signal, the terminal cannot transmit signals in a timing window where the first signal is located, as well as n1 symbols before the first signal and n2 symbols after the first signal, and n1 and n2 are positive integers;

wherein for the condition that the measurement gap is required for the measurement of the first signal, the terminal cannot transmit signals other than the measurement within the measurement gap.

2. The method according to claim 1, wherein the first configuration information comprises a configuration of a plurality of measurement gap patterns, and the configuration of each of the plurality of measurement gap patterns comprises at least one of the following: a measurement gap length, and a measurement gap repetition period.

3. The method according to claim 1, wherein the second configuration information supports the following configurations of the first and second measurement gap sharing schemes:

each measurement frequency layer equally splits measurement opportunities of the measurement gap;

intra-frequency measurement and inter-frequency measurement equally split the measurement opportunities of the measurement gap according to a ratio, and there are a plurality of values of the ratio.

4. The method according to claim 1, wherein the first measurement gap and/or the first measurement gap sharing scheme is determined according to whether the measurement gap is required before the BWP switch;

the second measurement gap and/or the second measurement gap sharing scheme is determined according to whether the measurement gap is required after the BWP switch;

wherein the terminal determines the first measurement gap before the BWP switch and the second measurement gap after the BWP switch from the first configuration information according to first indication information, and/or, determines the first measurement gap sharing scheme before the BWP switch and the second measurement gap sharing scheme after the BWP switch from the second configuration information according to second indication information.

5. The method according to claim 4, wherein the first indication information is carried in downlink control information DCI or a radio resource control RRC message;

wherein the second indication information is carried in DCI or RRC message;

wherein the DCI or the RRC message further carries third indication information, and the third indication information is used to indicate the terminal to switch from the first BWP to the second BWP.

6. The method according to claim 1, wherein the measurement of the first signal belongs to an intra-frequency measurement; or, the measurement of the first signal belongs to an inter-frequency measurement.

7. The method according to claim 1, wherein the method further comprises:

the terminal sending first capability information to the network device, and the first capability information is used to indicate a capability of measurement gap supported by the terminal.

8. A terminal, wherein the terminal comprises a memory and a processor, the memory is configured to store a computer program, and the processor is configured to execute the computer program stored in the memory to cause the terminal to perform an operation of:

receiving first configuration information and/or second configuration information sent by a network device, wherein the first configuration information is used for the terminal to determine a first measurement gap used before a bandwidth part (BWP) switch and a second measurement gap used after the BWP switch, the second configuration information is used for the terminal to determine a first measurement gap sharing scheme used before the BWP switch and a second measurement gap sharing scheme used after the BWP switch, wherein the terminal switches from a first BWP to a second BWP in a first measurement period, and the first measurement period is divided into a first time segment and a second time segment by a BWP switch interruption;

wherein:

in the first time segment, the first BWP is in an activated state;

if the first signal is completely located within the first BWP or the first BWP is an initial BWP, the measurement of the first signal does not require the measurement gap; or if the signal is completely or partially located outside the first BWP, the measurement of the first signal requires the measurement gap;

wherein:

in the second time segment, the terminal determines whether the measurement of the first signal requires the measurement gap based on a positional relationship between the second BWP and the first signal;

in the second time segment, the second BWP is in an activated state;

the step of the terminal determining, in the second time segment, whether the measurement of the first signal requires the measurement gap based on the positional relationship between the second BWP and the first signal comprises:

if the first signal is completely located within the second BWP or the second BWP is an initial BWP, the measurement of the first signal does not require the measurement gap;

if the first signal is completely or partially located outside the second BWP, the measurement of the first signal requires the measurement gap;

wherein:

if the terminal does not support simultaneous reception of the first signal and data, for the condition that the measurement gap is not required for the measurement of the first signal, the terminal cannot transmit signals in a timing window where the first signal is located; or if the terminal does not support simultaneous reception of the first signal and data, for the condition that the measurement gap is not required for the measurement of the first signal, the terminal cannot transmit signals in a timing window where the first signal is located, as well as n1 symbols before the first signal and n2 symbols after the first signal, and n1 and n2 are positive integers;

wherein for the condition that the measurement gap is required for the measurement of the first signal, the terminal cannot transmit signals other than the measurement within the measurement gap.

9. The terminal according to claim 8, wherein the first configuration information comprises a configuration of a plurality of measurement gap patterns, and the configuration of each of the plurality of measurement gap patterns comprises at least one of the following: a measurement gap length, and a measurement gap repetition period.

10. The terminal according to claim 8, wherein the second configuration information supports the following configurations of the first and second measurement gap sharing schemes:

each measurement frequency layer equally splits measurement opportunities of the measurement gap;

intra-frequency measurement and inter-frequency measurement equally split the measurement opportunities of the measurement gap according to a ratio, and there are a plurality of values of the ratio.

11. The terminal according to claim 8, wherein the first measurement gap and/or the first measurement gap sharing scheme is determined according to whether the measurement gap is required before the BWP switch;

the second measurement gap and/or the second measurement gap sharing scheme is determined according to whether the measurement gap is required after the BWP switch;

the terminal is further configured to determine the first measurement gap before the BWP switch and the second measurement gap after the BWP switch from the first configuration information according to first indication information, and/or, determine the first measurement gap sharing scheme before the BWP switch and the second measurement gap sharing scheme after the BWP switch from the second configuration information according to second indication information.

12. The terminal according to claim 11, wherein the first indication information is carried in downlink control information DCI or a radio resource control RRC message;

wherein the second indication information is carried in DCI or RRC message;

wherein the DCI or the RRC message further carries third indication information, and the third indication information is used to indicate the terminal to switch from the first BWP to the second BWP.

13. The terminal according to claim 8, wherein the measurement of the first signal belongs to an intra-frequency measurement; or, the measurement of the first signal belongs to an inter-frequency measurement.

14. The terminal according to claim 8, wherein the terminal is further configured to send first capability information to the network device, wherein the first capability information is used to indicate a capability of measurement gap supported by the terminal.

15. A network device, wherein the network device comprises a memory and a processor, the memory is configured to store a computer program, and the processor is configured to execute the computer program stored in the memory to cause the network device to perform an operation of:

sending first configuration information and/or second configuration information to a terminal, wherein the first configuration information is used for the terminal to determine a first measurement gap used before a bandwidth part (BWP) switch and a second measurement gap used after the BWP switch, the second configuration information is used for the terminal to determine a first measurement gap sharing scheme used before the BWP switch and a second measurement gap sharing scheme used after the BWP switch;

wherein the terminal switches from a first BWP to a second BWP in a first measurement period, and the first measurement period is divided into a first time segment and a second time segment by a BWP switch interruption;

wherein:

in the first time segment, the first BWP is in an activated state;

if the first signal is completely located within the first BWP or the first BWP is an initial BWP, the measurement of the first signal does not require the measurement gap; or if the signal is completely or partially located outside the first BWP, the measurement of the first signal requires the measurement gap;

wherein:

in the second time segment, the terminal determines whether the measurement of the first signal requires the measurement gap based on a positional relationship between the second BWP and the first signal;

in the second time segment, the second BWP is in an activated state;

the step of the terminal determining, in the second time segment, whether the measurement of the first signal requires the measurement gap based on the positional relationship between the second BWP and the first signal comprises:

if the first signal is completely located within the second BWP or the second BWP is an initial BWP, the measurement of the first signal does not require the measurement gap;

if the first signal is completely or partially located outside the second BWP, the measurement of the first signal requires the measurement gap;

wherein:

if the terminal does not support simultaneous reception of the first signal and data, for the condition that the measurement gap is not required for the measurement of the first signal, the terminal cannot transmit signals in a timing window where the first signal is located; or if the terminal does not support simultaneous reception of the first signal and data, for the condition that the measurement gap is not required for the measurement of the first signal, the terminal cannot transmit signals in a timing window where the first signal is located, as well as n1 symbols before the first signal and n2 symbols after the first signal, and n1 and n2 are positive integers;

wherein for the condition that the measurement gap is required for the measurement of the first signal, the terminal cannot transmit signals other than the measurement within the measurement gap.

16. The network device according to claim 15, wherein first configuration information comprises a configuration of a plurality of measurement gap patterns, and the configuration of each of the plurality of measurement gap patterns comprises at least one of the following: a measurement gap length, and a measurement gap repetition period.

17. The network device according to claim 15, wherein the second configuration information supports the following configurations of the first and second measurement gap sharing schemes:

each measurement frequency layer equally splits measurement opportunities of the measurement gap;

intra-frequency measurement and inter-frequency measurement equally split the measurement opportunities of the measurement gap according to a ratio, and there are a plurality of values of the ratio.

18. The network device according to claim 15, wherein the network device is further configured to receive first capability information sent by the terminal, and the first capability information is used to indicate a capability of measurement gap supported by the terminal.

* * * * *